(12) United States Patent
Rambacher et al.

(10) Patent No.: US 9,305,002 B2
(45) Date of Patent: *Apr. 5, 2016

(54) METHOD AND APPARATUS FOR EVENTUALLY CONSISTENT DELETE IN A DISTRIBUTED DATA STORE

(71) Applicant: Nokia Technologies Oy, Espoo (FI)

(72) Inventors: Mark Rambacher, Littleton, MA (US); Abhijit Bagri, Bangalore (IN); Yekesa Kosuru, Westford, MA (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,731

(22) Filed: Apr. 20, 2015

(65) Prior Publication Data

US 2015/0227538 A1    Aug. 13, 2015

Related U.S. Application Data

(63) Continuation of application No. 13/091,662, filed on Apr. 21, 2011, now Pat. No. 9,015,126.

(60) Provisional application No. 61/347,412, filed on May 22, 2010.

(51) Int. Cl.
   G06F 17/30    (2006.01)

(52) U.S. Cl.
   CPC ...... *G06F 17/30117* (2013.01); *G06F 17/3023* (2013.01); *G06F 17/30353* (2013.01); *G06F 17/30575* (2013.01); *G06F 17/30581* (2013.01)

(58) Field of Classification Search
   None
   See application file for complete search history.

(56) References Cited

U.S. PATENT DOCUMENTS

| | | | |
|---|---|---|---|
| 6,351,753 B1 | 2/2002 | Jagadish et al. | |
| 6,539,381 B1 * | 3/2003 | Prasad et al. | G06F 17/30 |
| 7,590,635 B2 | 9/2009 | Hillis et al. | |
| 7,647,329 B1 | 1/2010 | Fischman et al. | |
| 7,774,308 B2 | 8/2010 | Hillis | |
| 7,783,607 B2 | 8/2010 | Cooper et al. | |
| 8,375,011 B2 | 2/2013 | Fox et al. | |
| 2002/0133509 A1 | 9/2002 | Johnston et al. | |
| 2002/0141740 A1 | 10/2002 | Matsui | |
| 2003/0002586 A1 | 1/2003 | Jungers et al. | |
| 2003/0041227 A1 | 2/2003 | Nakamatsu | |

(Continued)

FOREIGN PATENT DOCUMENTS

FI    20055709 A    6/2007

OTHER PUBLICATIONS

International Search Report for related International Patent Application No. PCT/FI2011/050435 dated Nov. 8, 2011, pp. 1-9.

(Continued)

*Primary Examiner* — Son T Hoang
(74) *Attorney, Agent, or Firm* — Ditthavong & Steiner, P.C.

(57) ABSTRACT

Techniques for effective delete operations in a distributed data store with eventually consistent replicated entries include determining to delete a particular entry from the distributed data store. Each entry includes a first field that holds data that indicates a key and a second field that holds data that indicates content associated with the key and a third field that holds data that indicates a version for the content. The method also comprises causing, at least in part, actions that result in marking the particular entry as deleted without removing the particular entry, and updating a version in the third field for the particular entry.

19 Claims, 10 Drawing Sheets

(56) References Cited

U.S. PATENT DOCUMENTS

| | | | |
|---|---|---|---|
| 2003/0131025 A1 | | 7/2003 | Zondervan et al. |
| 2004/0181526 A1 | | 9/2004 | Burdick et al. |
| 2006/0015485 A1 | * | 1/2006 | Hofmann .................. 707/3 |
| 2006/0167920 A1 | * | 7/2006 | Hankinson ........ G06F 17/30292 707/1 |
| 2007/0156842 A1 | * | 7/2007 | Vermeulen et al. ........... 709/217 |
| 2007/0282915 A1 | | 12/2007 | Vosshall et al. |
| 2009/0271412 A1 | * | 10/2009 | Lacapra et al. ................. 707/10 |
| 2010/0153511 A1 | | 6/2010 | Lin |
| 2011/0208695 A1 | * | 8/2011 | Anand et al. .................. 707/610 |

OTHER PUBLICATIONS

Decandia et al. "Dynamo: Amazon's Highly Available Key-value Store", Symposium on Operating Systems Principles, 2007, retrieved from http://www.allthingsdistributed.com/files/amazon-dynamo-sosp2007.pdf, 16 pages.

Gifford, "Weighted Voting for Replicated Data", Stanford University and Xerox Palo Alto Research Center, 1979, retrieved from http://www.cs.cornell.edu/Courses/cs614/2003SP/papers/Gif79.pdf, 13 pages.

International Search Report for Pct Application No. PCT/FI2011/050435 dated Nov. 8, 2011, pp. 1-6.

Project Voldemort, "A Distributed Database, Internet Archive Wayback Machine", Feb. 13, 2010, pp. 1-8.

Brewer, "Towards Robust Distributed Systems", PODC Keynote, Jul. 19, 2000, retrieved from https://www.cs.berkeley.edu/~brewer/cs262b-2004/PODC-keynote.pdf, pp. 1-12.

Collins-Sussman et al. "Resurrecting Deleted Items", Chapter 4, Section 4.3, Version Control with Subversion, 2005, retrieved from http://svnbook.red-bean.com/en/1.1/svn-book.html#svn-ch-4-sect-4.3, pp. 94-96.

Vogels, "Amazon's Dynamo—All Things Distributed", Oct. 2, 2007, retrieved from http://www.allthingsdistributed.com/2007/10/amazons_dynamo.html, pp. 1-25.

* cited by examiner

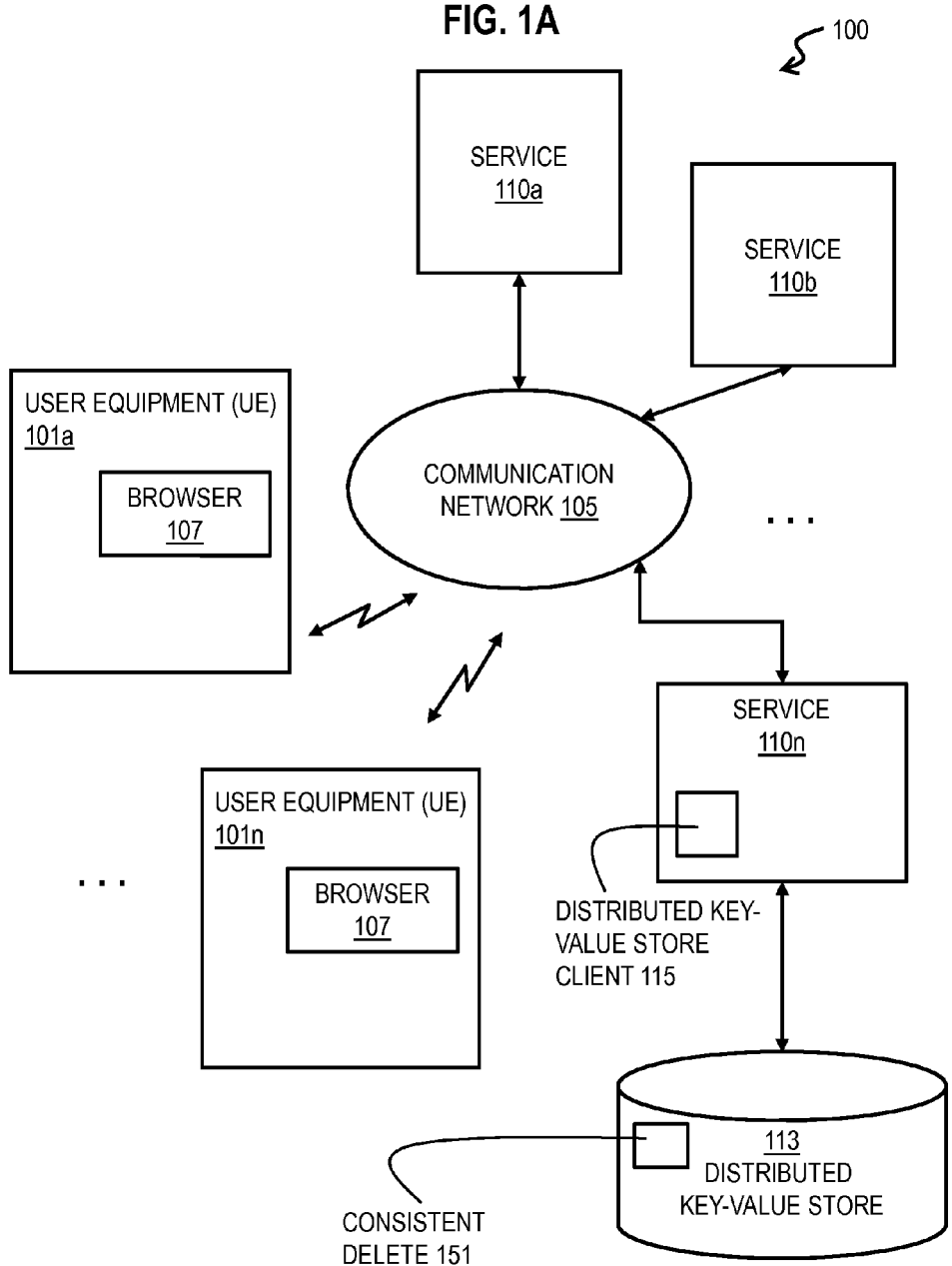

METHOD AND APPARATUS FOR EVENTUALLY CONSISTENT DELETE IN A DISTRIBUTED DATA STORE

RELATED APPLICATIONS

This application is a continuation U.S. application Ser. No. 13/091,662 filed Apr. 21, 2011, entitled "Method and Apparatus for Eventually Consistent Delete in a Distributed Data Store," which claims the benefit of the earlier filing date under 35 U.S.C. §119(e) of U.S. Provisional Application Ser. No. 61/347,412 filed May 22, 2010, entitled "Method and Apparatus for Eventually Consistent Delete in a Distributed Data Store," the entireties of which are incorporated herein by reference.

BACKGROUND

Service providers (e.g., wireless, cellular, etc.) and device manufacturers are continually challenged to deliver value and convenience to consumers by, for example, providing compelling network services. Important differentiators in the industry are application and network services as well as capabilities to support and scale these services. In particular, these applications and services can include accessing and managing data utilized by network services. These services entail managing a tremendous amount of user data. Some services store such data distributed among many network nodes using eventually consistent replicated entries for high availability. While suitable for many purposes, in some circumstances one or more nodes may be unavailable, leading to incomplete and ineffective delete operations.

Some Example Embodiments

Therefore, there is a need for techniques for effective delete operations in a distributed data store with eventually consistent replicated entries, called hereinafter eventually consistent delete operations.

According to one embodiment, a method comprises determining to delete a particular entry from a distributed data store with eventually consistent replicated entries. Each entry includes a first field that holds data that indicates a key and a second field that holds data that indicates content associated with the key and a third field that holds data that indicates a version for the content. The method also comprises causing, at least in part, actions that result in marking the particular entry as deleted without removing the particular entry, and updating a version in the third field for the particular entry.

According to another embodiment, a method comprises facilitating access to at least one interface configured to allow access to at least one service, the at least one service configured to perform at least determining to delete a particular entry from a distributed data store with eventually consistent replicated entries. Each entry includes a first field that holds data that indicates a key and a second field that holds data that indicates content associated with the key and a third field that holds data that indicates a version for the content. The service is further configured to cause, at least in part, actions that result in marking the particular entry as deleted without removing the particular entry, and updating a version in the third field for the particular entry.

According to another embodiment, an apparatus comprises at least one processor, and at least one memory including computer program code, the at least one memory and the computer program code configured to, with the at least one processor, cause, at least in part, the apparatus to determine to delete a particular entry from a distributed data store with eventually consistent replicated entries. The apparatus is also caused to cause, at least in part, actions that result in marking the particular entry as deleted without removing the particular entry, and updating a version in the third field for the particular entry.

According to another embodiment, a computer-readable storage medium carries one or more sequences of one or more instructions which, when executed by one or more processors, cause, at least in part, an apparatus to determine to delete a particular entry from a distributed data store with eventually consistent replicated entries. Each entry includes a first field that holds data that indicates a key and a second field that holds data that indicates content associated with the key and a third field that holds data that indicates a version for the content. The apparatus is also caused to cause, at least in part, actions that result in marking the particular entry as deleted without removing the particular entry, and updating a version in the third field for the particular entry.

According to another embodiment, an apparatus comprises means for determining to delete a particular entry from a distributed data store with eventually consistent replicated entries. Each entry includes a first field that holds data that indicates a key and a second field that holds data that indicates content associated with the key and a third field that holds data that indicates a version for the content. The apparatus also comprises means for causing, at least in part, actions that result in marking the particular entry as deleted without removing the particular entry, and updating a version in the third field for the particular entry.

According to another embodiment, a method comprises determining, for a distributed data store with eventually consistent replicated entries, that all replicas of a particular entry are marked as deleted. The method further comprises, in response to determining that all replicas of a particular entry are marked as deleted, causing, at least in part, actions that result in removal of the particular entry from a data structure of the distributed data store.

According to another embodiment, a method comprises facilitating access to at least one interface configured to allow access to at least one service, the at least one service configured to perform at least determining, for a distributed data store with eventually consistent replicated entries, that all replicas of a particular entry are marked as deleted. The service is further configured to perform, at least, causing, at least in part, actions that result in removal of the particular entry from a data structure of the distributed data store.

According to another embodiment, an apparatus comprises at least one processor, and at least one memory including computer program code, the at least one memory and the computer program code configured to, with the at least one processor, cause, at least in part, the apparatus to determine, for a distributed data store with eventually consistent replicated entries, that all replicas of a particular entry are marked as deleted. The apparatus is further configured to cause, at least in part, actions that result in removal of the particular entry from a data structure of the distributed data store.

According to another embodiment, a computer-readable storage medium carries one or more sequences of one or more instructions which, when executed by one or more processors, cause, at least in part, an apparatus to determine, for a distributed data store with eventually consistent replicated entries, that all replicas of a particular entry are marked as deleted. The apparatus is further configured to cause, at least in part, actions that result in removal of the particular entry from a data structure of the distributed data store.

According to another embodiment, an apparatus comprises means for determining, for a distributed data store with eventually consistent replicated entries, that all replicas of a particular entry are marked as deleted. The apparatus further comprises means for causing, at least in part, actions that result in removal of the particular entry from a data structure of the distributed data store.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of eventually consistent delete operations, according to one embodiment;

DESCRIPTION OF SOME EMBODIMENTS

Figure 1B:
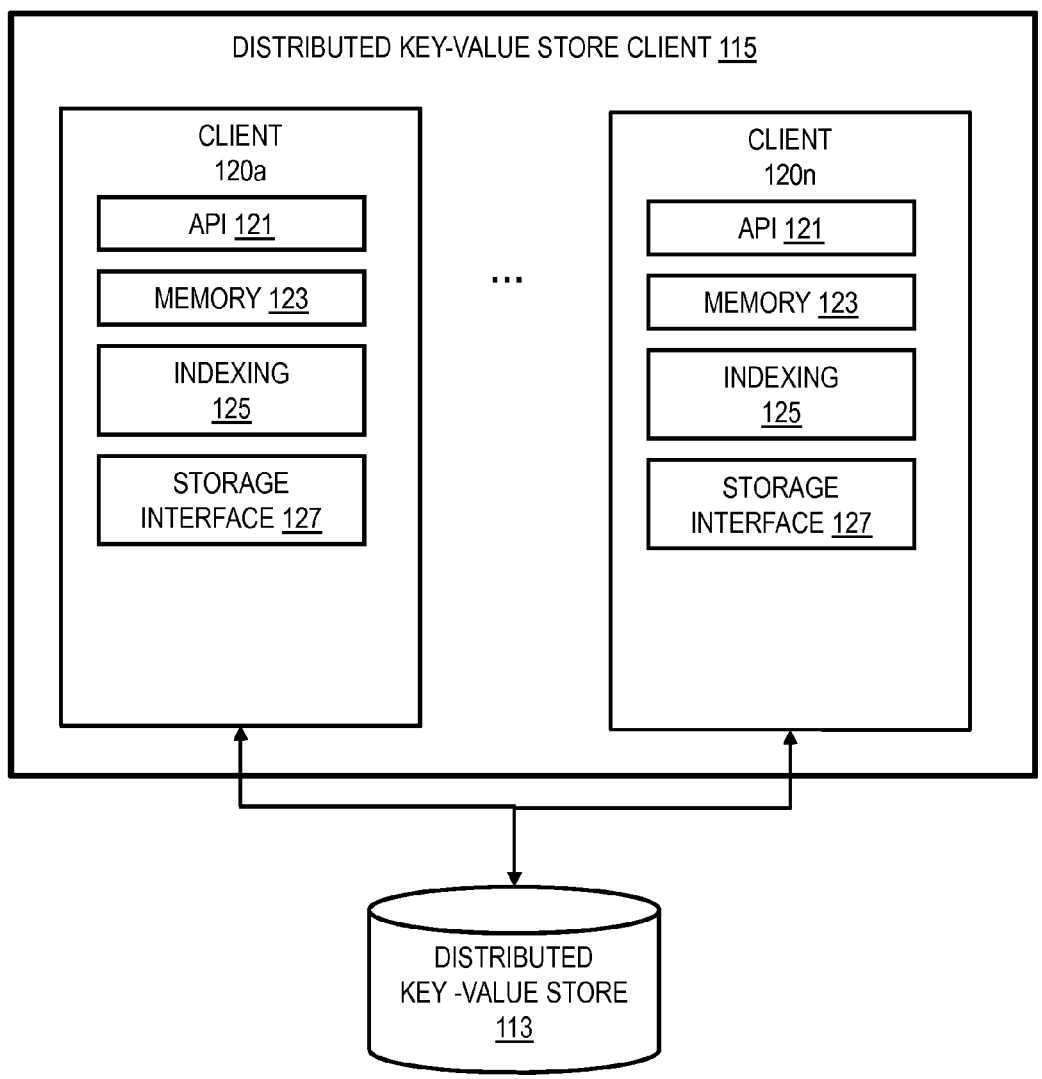
FIG. 1B is a diagram of the components of a distributed key-value store client, according to one embodiment.

Examples of a method, apparatus, and computer program for eventually consistent delete operations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term data store refers to one or more data structures for storing and retrieving data represented by physical phenomena. The data structure may be a single file, a file system, or a sophisticated database, such as a relational database, or any other arrangement of data. A distributed data store refers to multiple data structures spread over two or more nodes of a communications network, such as the Internet. To guard against node failure, entries in some distributed data stores are replicated on multiple nodes. Although various embodiments are described with respect to user profile data, it is contemplated that the approach described herein may be used with other data, such as customer data for a retailer or bank transaction data or scientific observations, among many others.

According to a data store theorem called the CAP theorem, all distributed data store systems have unavoidable trade-offs between consistency (C), availability (A), and tolerance to network partitions (P). Consistency is a property by which all users of the data store see the same view, even in the presence of updates. This means that data stored in all replicas is the same at all times. Availability is a property by which all users of the data store can find some replica of the data, even in the presence of failures by one or more nodes. Partition-tolerance is a property by which data store operations will complete, even if portions of the network become disconnected, i.e., a network partitions into multiple disconnected networks. It has been proven that it is not possible to have all three of these, and the CAP theorem recommends picking any two. No large scale real-world data store can serve completely consistent data while being 100% available and handling disconnected networks or other network failures.

One approach to distributed data store with replicate entries is eventual consistency of replicated entries, for which availability and partition tolerance are supported at the expense of perfect consistency. With eventually consistency, at least some replicates of an entry, but not all replicates, are required to be consistent. A replicate of an entry is consistent if the contents stored in the entry are the same. Eventual consistency allows retrieval even when one or more nodes are unavailable, or were unavailable during the most recent write of the entry. The replicated entries with older versions of the contents eventually adopt the newer versions of the contents of other replicated entries. For example, in a process called read repair, when a subsequent read reveals discrepancies among the contents of replicated entries, the most recent version of the contents is returned and older versions of the contents are ignored. The user of the data then can decide whether to further operate on the most recent version of the contents. With eventual consistency, stale reads are possible, i.e. the result of a read operation is a value that has been replaced on at least one node if one or more of the nodes are unavailable at the time of the read. In some implementations, while consistency across all nodes is not guaranteed, at least a user can be guaranteed to see the user's own updates, thus providing read-your-own-writes consistency.

In prior approaches, a successful delete operation results in the removal of an entry. However, it is possible for delete operations to fail and for deleted entries to re-appear unintentionally. For example, if a delete operation is performed when one node is unavailable, then an entry remains on that node, while corresponding entries are removed from the other nodes that are available to the network. When a subsequent read operation is performed after the formerly unavailable node has rejoined the network, that node will return the old value for that entry. A read repair operation will not find any newer versions for that entry and will return that old value to a user of the data store. The deleted entry has thus unintentionally re-appeared.

FIG. 1A is a diagram of a system 100 capable of eventually consistent delete operations, according to one embodiment. In the illustrated embodiment, a plurality of network services 110a, 110b through 110n (collectively referenced hereinafter as network services 110) are available through communication network 105 to a plurality of users operating user equipment (UE) 101a through 101n (collectively referenced hereinafter as UE 101). One or more of services 110 store a large amount of user data on a distributed data store with eventually consistent replicated entries, such as distributed key-value store 113. Each entry is indexed by a key and includes some digital content as a value (the key-value pair constitutes an entry, as used herein). For example, a user name serves as a key for a value that indicates user profile information, including user contacts, photographs, music files and other digital content. The key-value pairs are stored on multiple nodes of a network, such as network 105, with each entry (corresponding to each key) replicated on several nodes. The nodes are determined based on the key which serves as an index into the distributed key-value store 113. A distributed key-value store client 115 determines the keys to be used to organize the data, e.g., the user name, user account, bank account, or scientific experiment number.

As used herein, the term content refers to any digital data, including data that can be presented for human perception, for example, digital sound, songs, digital images, digital games, digital maps, point of interest information, digital videos (such as music videos, news clips and theatrical videos), documents, advertisements, program instructions or data objects, any other digital data, or any combination thereof. Content is stored in one or more data structures, such as files or databases.

The network services 110 may share the information in the distributed key-value store 113, each such service including a distributed key-value store client 115 to identify the keys to be employed. Each service is configured to read or write or delete key-value pairs in the distributed key-value store 113, using a few simple commands, e.g., get, put and delete, respectively.

For purposes of illustration, it is assumed that the distributed key-value store with eventually consistent replicated entries (also called an eventually consistent distributed data store, hereinafter), comprises key-value entries that are replicated on an odd number N of network nodes. A read (get) or write (put) operation is completed if at least a quorum of nodes respond to the operation, thus ensuring a quorum of nodes is consistent even if one or more nodes are unavailable. A quorum is defined such that a number of successful reads (R) plus a number of successful writes (W) is greater than the number of replicates (N), i.e., R+W>N. In an illustrated embodiment, a simple embodiment is used, with N=3, W=2 and R=2.

A problem arises during deletes if one of the nodes where an entry is stored is unavailable when the delete operation is performed. For example, a particular entry, e.g., for key=user A, is stored on 3 nodes of the distributed key-value store 113. If one of those nodes is unavailable when a delete user A operation is performed, then the entry for key=user A is removed from two nodes and the operation is successful. This may happen for example, when a user un-subscribes from network service 110*n*. Later, when service 110*b* attempts to see if user A is currently a subscriber, a "get" operation, with key=user A is performed. As a result, the node that was unavailable during the delete will return the profile for user A, while one or two others will reply with no value. A read repair will resolve the discrepancy by returning the profile for user A to the service 110*b*. The network service 110*b* will then use the data in the user profile for user A, unaware that user A has un-subscribed.

To address this problem, a system 100 of FIG. 1A introduces the capability for eventually consistent delete operations to prevent a read repair from reviving a deleted entry. In an illustrated embodiment, a consistent delete module 151 is included in the distributed key-value store 113, as described in more detail below with reference to FIG. 1D and FIG. 3.

As shown in FIG. 1A, the system 100 comprises user equipment (UE) 101 having connectivity to network services 110 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Figure 8:
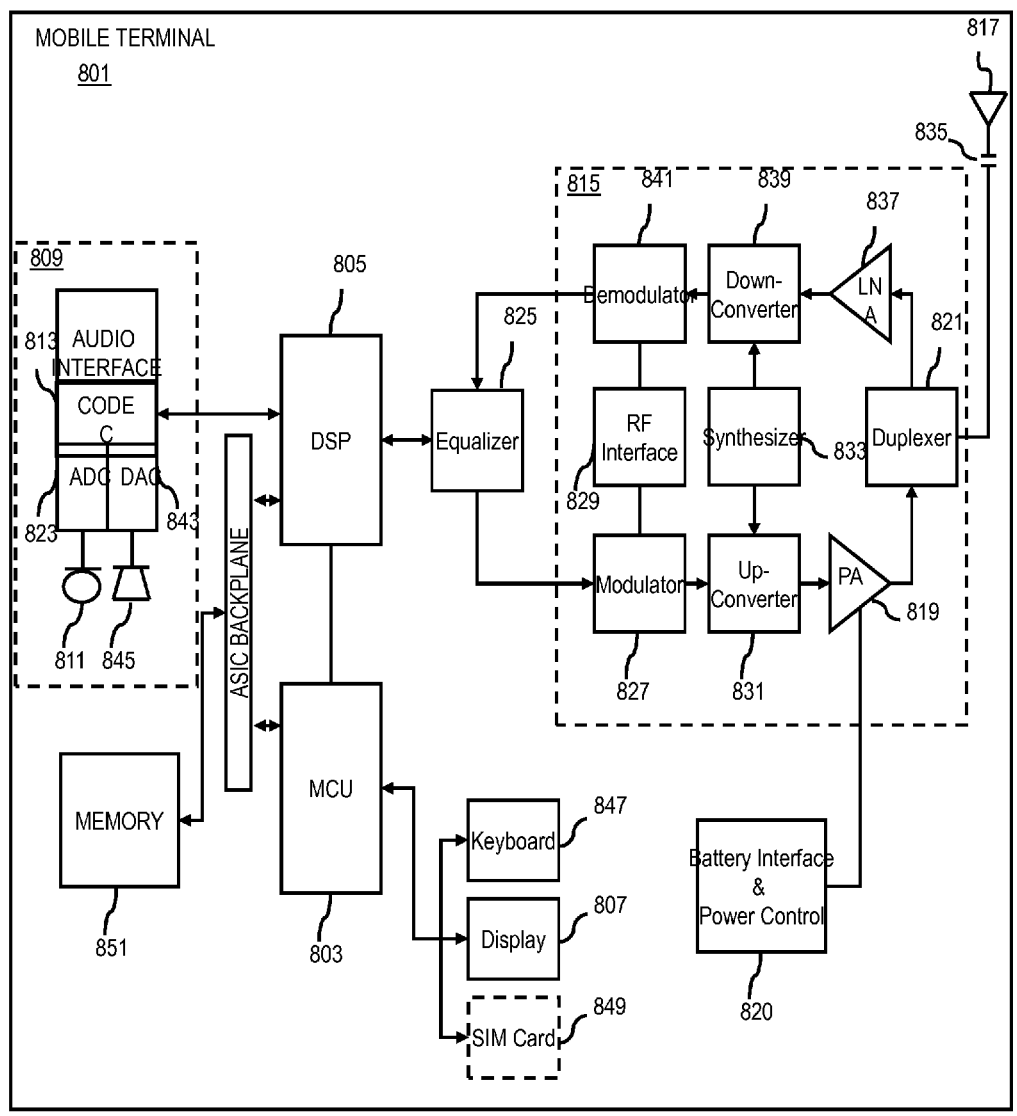
FIG. 8 is a diagram of a mobile terminal (e.g., handset) that can be used to implement an embodiment of the invention.

The UE 101 is any type of mobile terminal as depicted in FIG. 8, or fixed terminal, or wireless terminal including a mobile handset, a station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, network services 110 and distributed key-value store 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. For example, in some embodiments, the network services 110 are World Wide Web servers, and the UE 101 each include a browser 107 with which to obtain those services.

FIG. 1B is a diagram of the components of a distributed key-value store client 115, according to one embodiment. By way of example, the distributed key-value store client 115 includes one or more components for providing indexing and searching services to users of the network service 110n. It is contemplated that the functions of these components may be combined in one or more components or performed by other components of equivalent functionality. In the illustrated embodiment, the distributed key-value store client 115 includes one or more clients 120a-120n (collectively referenced hereinafter as clients 120) each of which may be utilized to index and/or search and retrieve information from the key-value store 113 based on a query from the network service 110. Each client 120 may include an API 121, memory 123 for storing, searching, and utilizing an index of a data structure, an indexing module 125 for generating, searching, and updating indexes, and a storage interface 127 utilized to retrieve information from the distributed key-value store 113.

In certain embodiments, the distributed key-value store client 115 may be implemented utilizing a computing cloud. As such, the distributed key-value store client 115 may include clients 120 corresponding to different geographical locations. The client 120 may include an API 121 that is used by a network service to control the operation of the distributed key-value client 115. Other clients and services outside of the network service 110n may also operate the distributed key-value store client 115 through the API 121.

In some embodiments, the clients 120 also index the keys so that searches can be performed to find a key associated with certain properties of the associated value, such as user age, residence city, or other information included in the user profile stored as the associated value. In such embodiments, the storage interface 127 interacts with the distributed key-value store 113 to process a request for indexing a profile that has been created and stored in the distributed key-value store 113. When the client 120 receives a request to index a profile, the indexing module 125 of the client 120 may instantiate one or more data structures for the profile and add the data structure instances to the associated index in the memory 123. In certain embodiments, once the data structures are added to the index, the instantiated data structures are communicated to other key-value store clients 120 to update replicated indexes. In embodiments with multiple indexes, if a particular client 120a becomes overloaded or faults, the load may be distributed to other clients (e.g., client 120n).

Further, the storage interface 127 may communicate with the distributed key-value store 113 using one or more interfaces. For example, the storage interface 127 may receive data about new profiles for generating an index using a particular profile and retrieve stored information utilizing another interface. For example, to retrieve stored information, the storage interface 127 may use a simple interface that utilizes get, put, delete, and scan commands. Alternatively or additionally, the storage interface 127 may utilize another API to communicate with the distributed key-value store 113, which may translate the communications to a simple interface with just get, put and delete commands.

Figure 1C:
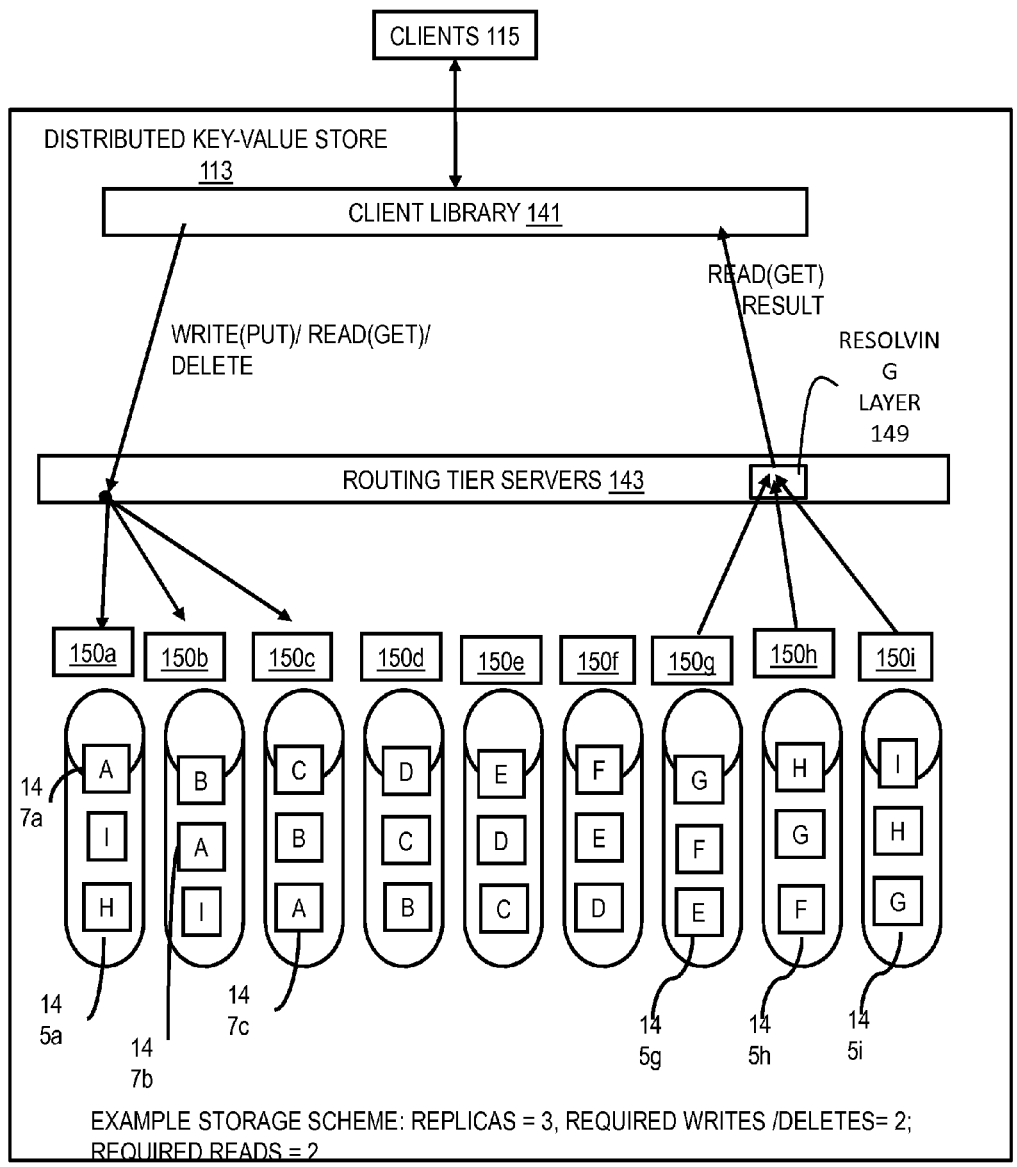
FIG. 1C is a diagram of the components of a distributed key-value store, according to one embodiment.

FIG. 1C is a diagram of the components of a distributed key-value store 113, according to one embodiment. By way of example, the key-value store 113 includes one or more components for providing eventually consistent, replicated distributed storage of data that can be indexed, stored, retrieved, and searched. Thus, a new profile may be stored in the distributed key-value store 113. It is contemplated that the functions of these components may be combined in one or more components or performed by other components of equivalent functionality. It is further contemplated that other forms of data structures and databases may be utilized in place of or in addition to the distributed key-value store 113. In the illustrated embodiment, the distributed key-value store 113 includes a client library 141 that is used to communicate with clients 120 on one or more distributed key-value store clients 115, and routing tier servers 143. The routing tier servers 143 manage replicates of each key-value entry data structure stored on different data storage nodes 145a-145i (collectively referenced hereinafter as storage nodes 145). Each of data storage nodes 145a-145i comprises one or more network nodes and is controlled by a corresponding local data structures service 150a-150i, respectively (collectively referenced hereinafter as local data structures service 150).

The storage interface 127 of the clients 120 of distributed key-value store client 115 or other interfaces on various network services 110 communicate with the distributed key-value store 113 using a client library 141. In certain embodiments, the clients 120 and other interfaces are clients receiving database services from the distributed key-value store 113. The client library 141 includes an interface that can determine which routing tier servers 143 to communicate with to retrieve content for a particular entry. In the illustrated embodiments, data is stored on storage nodes 145 utilizing a key and value mechanism that arranges storage using the key. A portion of each database (e.g., portions A-I) can be linked to a key. In one embodiment, the key is hashed to determine to which portion the key is linked (e.g., the key that represents an identifier, such as a user name, is hashed into a number k). In some embodiments, a key is hashed using a ring method, for example. Using the ring, each hashed number k is mapped to a primary location as well as one or more backup locations. The backup locations may be locations associated with the next server or host associated with the hash value, such as in a configuration file that maps each hash value k to one or more nodes. The client library 141 determines which servers 143 to read and write information from and to using the hash value. The client library 141 and the servers 143 may each include a lookup table including which portions k belong to which servers 143.

In certain embodiments, the portion k (e.g., portion A 147a-147c) may be stored using multiple local data structure services 150 over corresponding multiple data storage nodes 145. In one implementation, portions may be replicated over a number N (e.g., N=3) of local data structure services 150 and corresponding data storage nodes 145 for redundancy, failover, and to reduce latency. Moreover, the portions may be written to, and read from, at the same time by the client library 141. In some embodiments, when reading from the data storage nodes 145, the routing tier servers 143 determine if there are any consistency issues (e.g., portion 147a does not match portion 147b). If so, the inconsistency is resolved in a resolving layer module 149 on one or more of the routing tier servers or other nodes of the network. In an example storage scheme, one or more operations (e.g., get, put, delete) must be confirmed by a quorum or more of nodes for a successful operation (e.g., for N=3, R=2, W=2, required confirmed gets=2, required confirmed puts=2, and required confirmed deletes=W=2). This allows for redundancy and quorum consistency. If a storage node 145a fails or is otherwise incapacitated, a portion 147a associated with the storage node 145a may be later updated by servers 143 with content it should include based on replicated portions 147b, 147c. In other embodiments, other odd numbers N of replicates are used, with a quorum of confirmations required for a successful, get (R), put (W) or delete (W) operation.

The network service 110 may request that new content (e.g., a new user profile) be stored in the distributed key-value store 113. The new content is assigned a key in the network service 110 or client 120, e.g., based on an account identifier associated with the new profile. Then, the key is hashed to determine a portion k1 (e.g., portion A 147) in which to store the new profile, and to determine a server of the routing tier servers 143 based on the portion k1. Next, the entry is sent by the routing tier server 143 to the local data structure service 150 (e.g., 150a) to be stored in a primary storage node 145 (e.g., 145a) as well as in backup local data structure services 150 (e.g., 150b and 150c) to be stored in a replicated storage nodes 145 (e.g., 145b and 145c) based on a configuration file associating the hashed value k1 with these services 150. The entry is stored as a value associated with the key. The values comprise the contents, e.g., the user profile data. Once a quorum of services 150 (e.g., 150a and 150c) return confirmations that the put has been completed, the routing tier server 143 sends notification to the clients 115 via the client library interfaces 141 that the entry has been updated successfully. The clients 115 then add the entry to the appropriate indexes, if any.

To retrieve a profile at a later time, e.g., to retrieve the user profile associated with a key that hashes to a value k2 (e.g., portion G, 148), the hash k2 of the key is used to get the profile from the routing tier server 143 associated with the portion. The entry is requested by the routing tier server 143 from the local data structure service 150 (e.g., 150g) of the primary storage node 145 (e.g., 145g) as well as in backup local data structure services 150 (e.g., 150h and 150i) to be retrieved from replicated storage nodes 145 (e.g., 145h and 145i) based on a configuration file associating the hashed value k2 with these services 150. Once a quorum of services 150 (e.g., 150h and 150i) return results of the get (thus confirming that the get has been completed by those services 150), the routing tier server 143 compares the replicated values to ensure there is no discrepancy. If there is a discrepancy, then the replicated values are sent to the resolving layer module 149 to resolve the discrepancy, as described in more detail below. If only less than a quorum return results, the get fails. The routing tier server 143 sends notification with the successful returned or resolved value to the clients 115 via the client library interfaces 141, or notification that the get failed.

Once an index, if any, is created by the distributed key-value store clients 115 and the corresponding entries (e.g., user profiles) are stored in the distributed key-value store 113, the network service 110 may receive a query from a UE 101 or other service 110 to cause a client 120 to search for and retrieve information based on an indexed property (user name, age, location, etc.). The client 120 can then retrieve an index associated with the query and search the index for the key. The search may be a text based search. Further, the requested content may specify a part of the value (e.g., a subset of the entire user profile) in which the query is interested. The distributed key-value store client 115 returns the requested part of the value to the requesting process (e.g., UE 101 or network service 110).

Figure 1D:
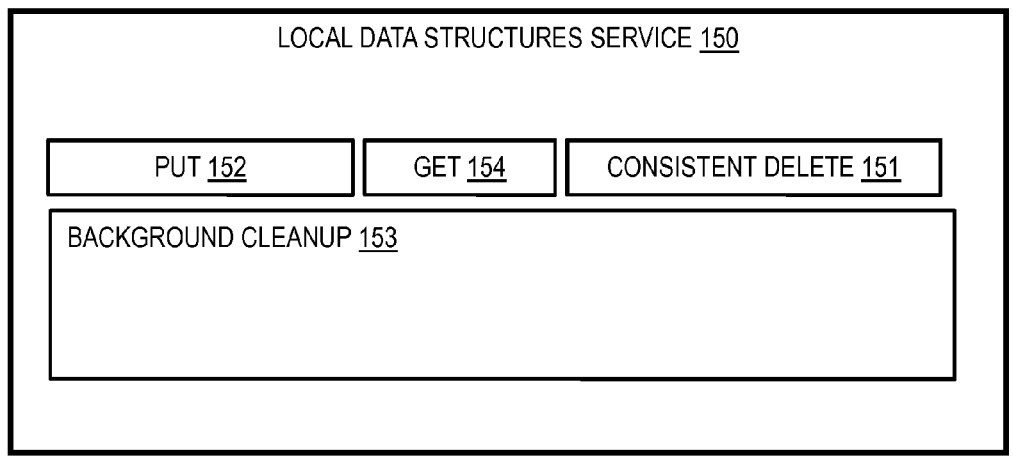
FIG. 1D is a diagram of a local data structure service, according to an embodiment.

FIG. 1D is a diagram of a local data structure service 150, according to an embodiment. The service 150 includes a put module 152, a get module 154, a consistent delete module 151 and a background cleanup module 153. It is contemplated that the functions of these components may be combined in one or more components or performed by other components of equivalent functionality. The put module 152 causes an entry to be stored on the storage node 145, either adding a record to the data structure on that node or changing the contents of a record already in the data structure, and sends notification when the put is completed. The get module 152 causes a value to be extracted from a record of the local data structure on storage node 145, and sends notification with the retrieved value when the get is completed. If the entry is not found, then the notification indicates the entry is not found, i.e., there is no entry with the requested key. Any method to implement these modules may be used, including methods previously known.

In contrast to previous approaches, in response to receiving a particular key of an entry to be deleted, the consistent delete module 151 does not remove an entry for that particular key from the data structure on the storage node 145. Rather, the consistent delete module 151 marks the entry as deleted, e.g., by causing a field associated with the particular key to indicate the entry is deleted, and to update a version associated with the particular entry. This technique prevents the unintentional revival of a deleted entry, as is described in more detail below.

For example, if a delete command is sent to routing servers 143 for a key that hashes to k2, the routing servers 143 send the delete command to local data structure services 150g, 150h and 150i. If service 150g for storage node 145g is unavailable, the delete command is only implemented at services 150h and 150i, where data associated with the entry is marked as deleted and a version is updated. Upon a subsequent read, when service 150g is back on line but service 150h is unavailable, two different values are returned, an undeleted value with an early version from 150g and a deleted indicator with a later version from 150i. The discrepancy is sent to the read resolving layer module 149 where the later version is taken as the correct value. The routing tier server 143 then returns to the clients 115 a notification indicating a successful determination that the entry is not stored. Thus the deleted entry is not unintentionally revived. An entry marked as deleted with an updated version is one example means for achieving the advantage of not reviving unintentionally a deleted entry.

In contrast, using previous approaches that remove the entry, the deleted entry can be unintentionally revived. For example, if a delete command is sent to routing servers 143 for a key that hashes to k2, the routing servers 143 sends the delete command to local data structure services 150g, 150h and 150i. If service 150g is unavailable, as above, the delete command is only implemented at services 150h and 150i, where the particular entry is removed from the data structures on storage nodes 145h and 145i. Upon a subsequent read, when service 150g is back on line but service 150h is unavailable, two different values are returned, an undeleted value with an early version from 150g and a null value without a version from 150i. The discrepancy is sent to the read repair in resolving layer module 149 where the only version with the old value is taken as the correct value. The routing tier server 143 then returns to the clients 115 a notification indicating a successful get of the old value. Thus the deleted entry is unintentionally revived.

In some embodiments, the resolving layer module 149 is modified to automatically write the correct value to all replicates, e.g., to mark the particular entry as deleted, in an attempt to cause the entry on 150g to be marked deleted. If service 150g is again unavailable, the delete remains unsuccessful; but eventually, after a sufficient number of reads followed by deletes, the entry is marked deleted on the last service, e.g., service 150g. A resolving layer module 149 that automatically puts a correct value to all replicates of an entry is an example means to achieve the advantage of reducing a chance of having to resolve the same discrepancy again at a later time.

The background cleanup module 153 is configured to remove an entry from the local data structure 145 only after all replicates of the entry have been marked deleted. In the illustrated embodiment, it is determined that all replicates of the entry have been marked deleted based on receiving a message from the routing tier server 143 that indicates the particular entry can be removed. The routing tier makes that determination based on receiving responses to a get command from all local data structure services 150 that replicate the entry, in which all responses indicate that the particular entry is marked deleted. The background cleanup module 153 is an example means to achieve the advantage of removing deleted entries from a data storage device and recover storage space.

Figure 2:
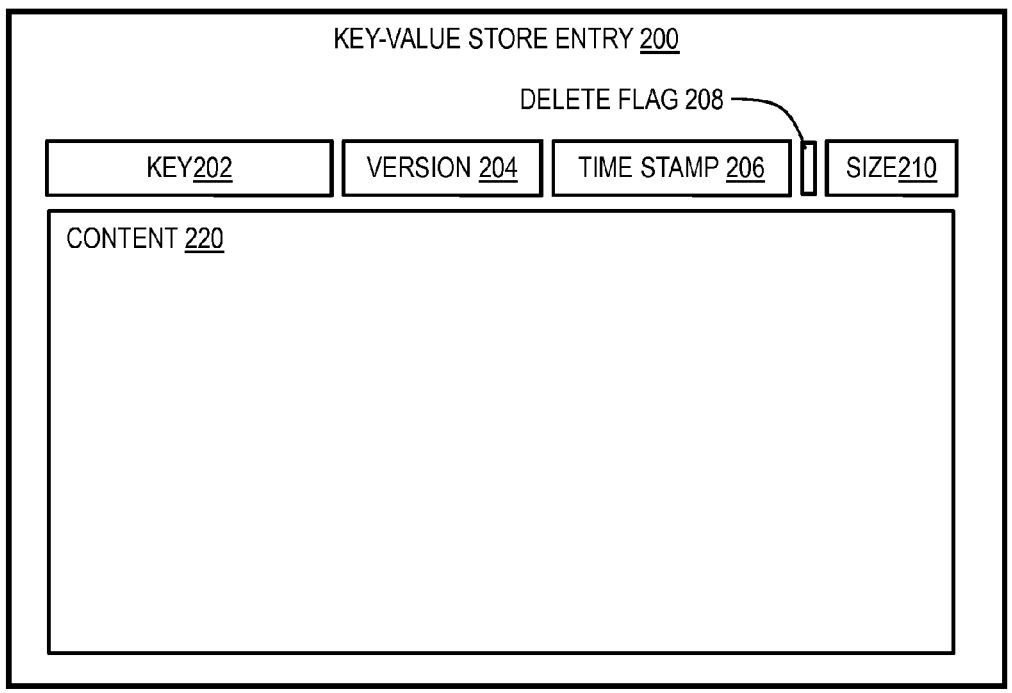
FIG. 2 is a diagram of a data structure for a key-value store entry, according to one embodiment.

FIG. 2 is a diagram of a data structure on a storage node 145 for a key-value store entry 200, according to one embodiment. Although fields are shown as contiguous blocks in a particular order for purposes of illustration, in other embodiments one or more fields, or portions thereof, are omitted or arranged in a different order in the same or different blocks of memory on one or more data storage devices or in one or more databases or database tables of a relational database, or one or more additional fields are added, or the data structure is changed in some combination of ways.

In the illustrated embodiment, the key-value store entry 200 includes a key field 202, a version field 204, a time stamp field 206, a delete flag field 208, a size field 210 and a content field 220. The entry 200 is stored on a primary storage node 145 and replicated on one or more other storage nodes 145. In some embodiments, the version field 204, time stamp field 206, delete flag field 208, size field 210 and content field 220 together constitute the value of the key-value pair. In some embodiments, one or more of the version field 204, time stamp field 206, delete flag field 208 and size field 210 are included in the content field 220.

The key field 202 holds data that indicates the key, e.g., the user name or account number or scientific experiment number. In some embodiments, the key field 202 is limited in size or fixed in size (e.g., to 768 bits).

The version field 204 holds data that indicates a version during evolution of the content stored in the content field 220. For example, in some embodiments, version field 204 holds data that indicates an integer that is incremented whenever the content field 220 is updated.

The time stamp field 206 holds data that indicates a date and time when the content field 220 is updated. In some embodiments, the data in the time stamp field 206 is used instead of the data in the version field 204 and the version field 204 is omitted. An advantage of using a version field 204 is that entries are updated eventually rather than simultaneously, and therefore two replicate entries with the same version may have different time stamp values. An advantage of the time stamp field 206 is to choose between different contents with the same version number as described in more detail below with reference to FIG. 4. Time stamp field 206 is an example means to achieve this advantage.

The size field 210 holds data that indicates the size of the content field 220. An advantage of using the size field 210 is that storage is not wasted by reserving a large amount of storage for a small amount of content. In some embodiments, a maximum value for the size of the content is set (e.g., 64 megabytes, MB, where 1 byte=8 bits and one megabyte=1024×1024 bytes). In some embodiments, the size field 210 is omitted.

The content field 220 holds data that indicates the content, including one or more metadata fields and the content to be rendered or, at least, a pointer to a storage location where the content or metadata, or both, are stored.

The delete flag field 208 holds data that indicates whether the entry 200 has been deleted but not removed from the local data structure on storage node 145. For example, the delete flag field is one bit that is in one state (e.g., zero) if the entry is not deleted, and in a different second state (e.g., 1) if the entry is marked deleted but not yet removed. In some embodiments, the size field 210 is used instead of the delete flag field 208. The entry is marked deleted (but not removed) when the size field 210 holds data that indicates a size of zero, and is not marked as deleted if the size field 210 holds data that indicates a non-zero actual size of the content 220. An advantage of a separate flag field 208 is that the size field can still be used to indicate how much of the space originally occupied by the content field 220 is still available for reuse, e.g., by a different key-value store entry. The delete flag field is an example means to achieve this advantage. An advantage of any field that indicates the associated entry is deleted but not removed is to retain a version field that allows a later deletion to prevent an earlier version of the data from being presented to a client by a read repair module, e.g., in resolving layer module 149. Marking an entry as deleted without removing the entry is an example means to achieve this advantage.

Figure 3:
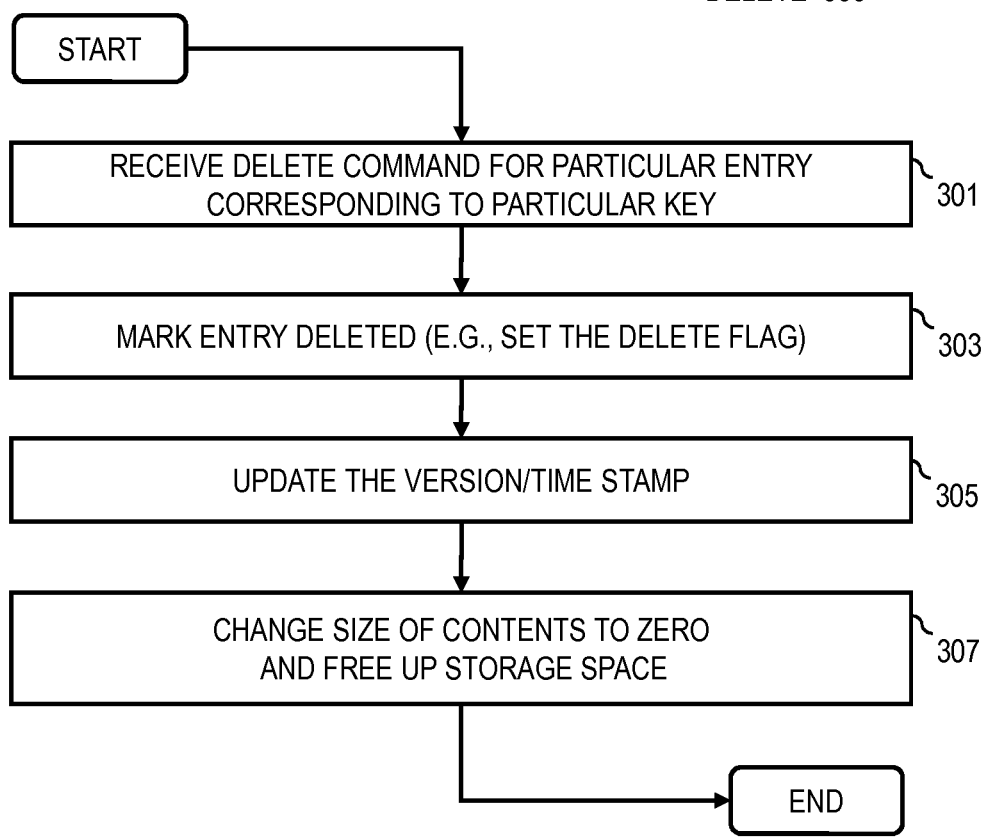
FIG. 3 is a flowchart of a process for eventually consistent delete operations, according to one embodiment.
Figure 6:
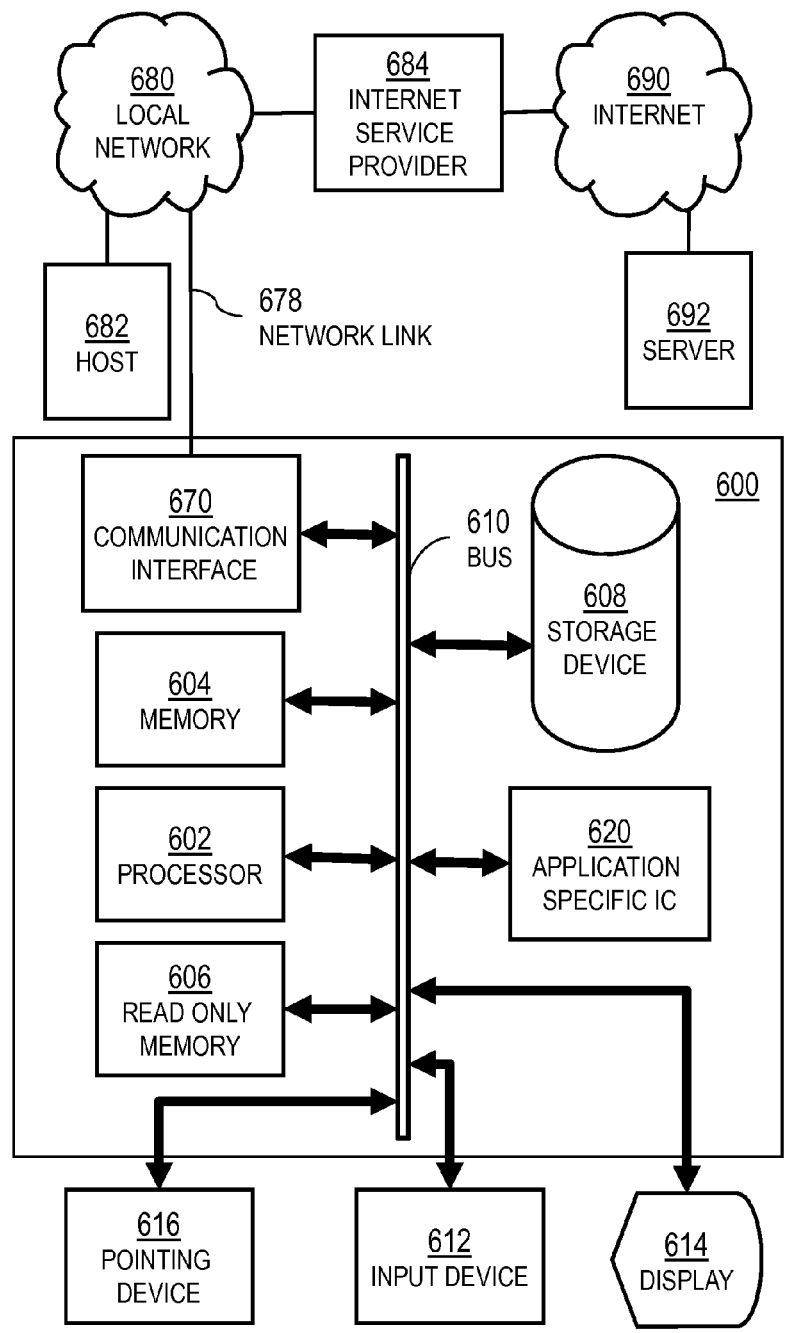
FIG. 6 is a diagram of hardware that can be used to implement an embodiment of the invention.
Figure 7:
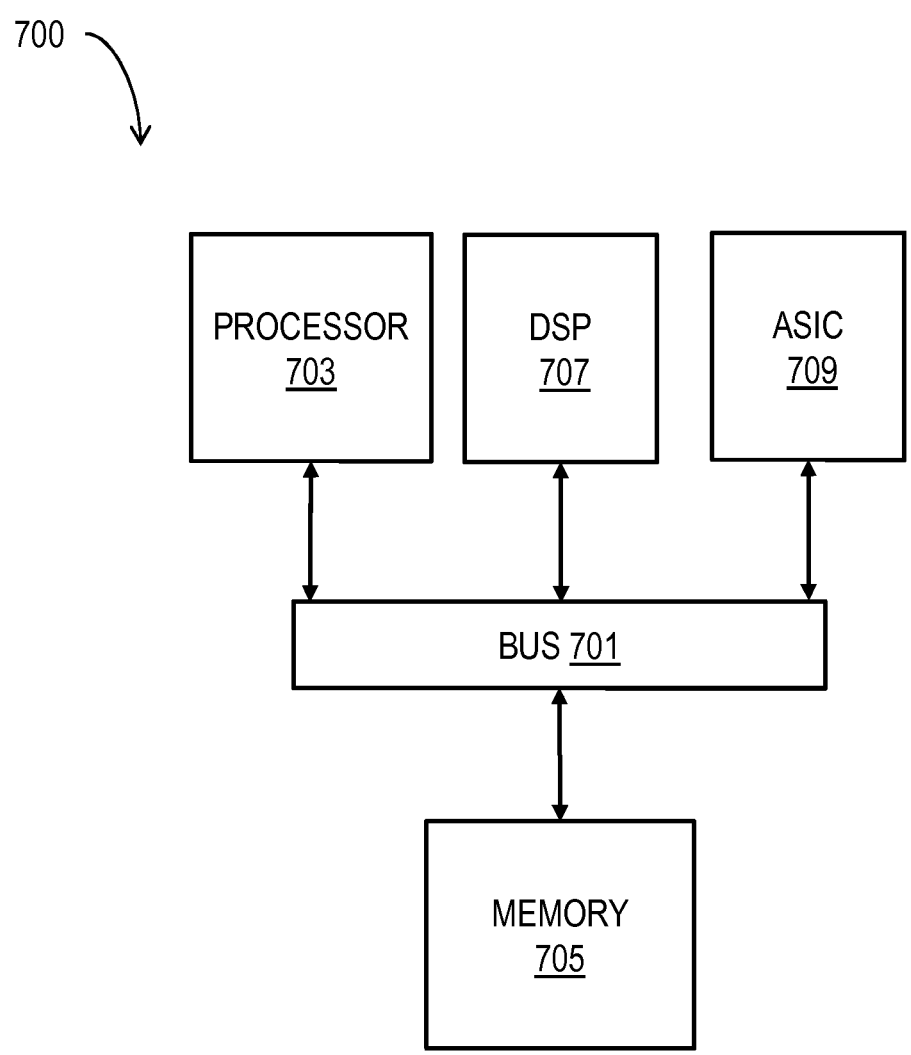
FIG. 7 is a diagram of a chip set that can be used to implement an embodiment of the invention.

FIG. 3 is a flowchart of a process for eventually consistent delete operations, according to one embodiment. In one embodiment, the consistent delete module 151 of a local data structure service 150 performs the process 300 and is implemented in, for instance, a chip set including a processor and a memory as shown in FIG. 7 or a computer system as shown in FIG. 6. In some embodiments, each of one or more routing tier servers 143 performs the process 300 and is implemented in, for instance, a computer system as shown in FIG. 6.

In step 301, it is determined whether a particular entry is to be deleted. For example, a command is received through an API or a message is received from client 115 through client library 141 at routing tier server 143, or a message is received at local data structures service 150 from a routing tier server 143 to delete a particular entry associated with a particular key. Thus, step 301 includes determining to delete a particular entry from a distributed data store with eventually consistent replicated entries. Each entry includes a first field that holds data that indicates a key and a second field that holds data that indicates content associated with the key and a third field that holds data that indicates a version for the content.

In step 303 the particular entry is marked as deleted without removing the entry. For example, in some embodiments the data in the delete flag field 208 is set to indicate the entry is deleted. In some embodiments, data in the size field 210 is set to indicate zero size. Thus, step 303 includes marking the particular entry as deleted without removing the particular entry.

In step 305, the version or timestamp, or both, is updated. In some embodiments, one or the other is omitted, and the omitted field is not updated. Thus, step 305 includes updating a version in the third field for the particular entry, where the third data field is at least one of the version field 204 and the time stamp field 206. In some embodiments, a version number is used in the version field 204. In such embodiments, step 305 includes determining a current version number based on data in the third field for the particular entry, and storing in the third field for the particular entry data that indicates a later version number than the current version number.

In step 307, the storage space occupied by the content field 220 is made available (i.e., freed up). If the size has not been set to zero in step 303, then it is set to zero during step 307, at least as the storage space consumed by the content field 220 is released for other uses. For example, a null value is stored in size data field 210. Thus step 307 includes storing a null value in the second field for the particular entry and freeing storage space equivalent to a difference between storage space occupied by an original value in the second field and storage space occupied by the null value.

Figure 4:
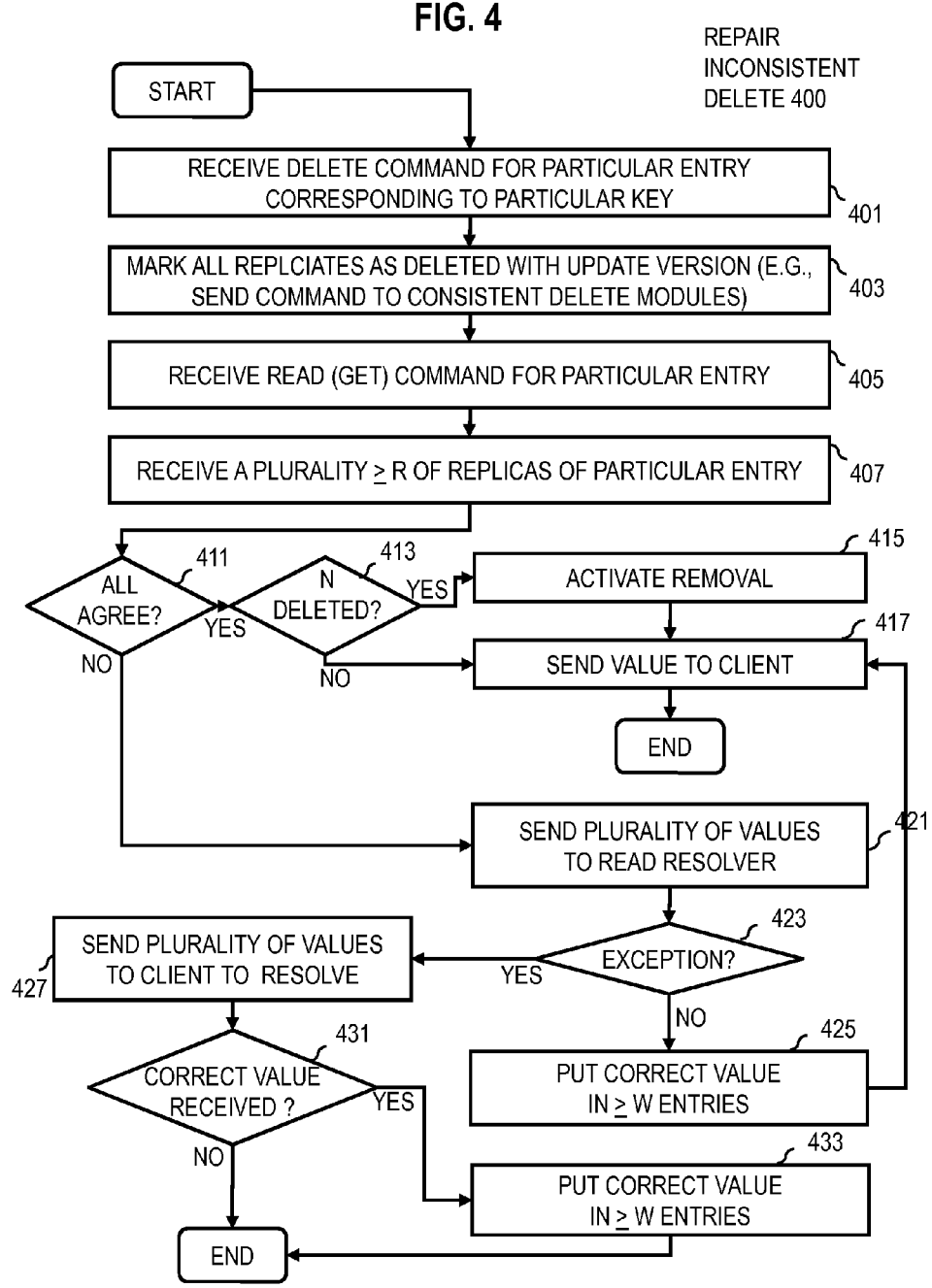
FIG. 4 is a flowchart of a process for repairing inconsistent delete operations, according to one embodiment.

FIG. 4 is a flowchart of a process 400 for repairing inconsistent delete operations, according to one embodiment. In one embodiment, the consistent delete module 151 of a local data structure service 150 performs all or part of the process 400 and is implemented in, for instance, a chip set including a processor and a memory as shown in FIG. 7 or a computer system as shown in FIG. 6. In some embodiments, each of one or more routing tier servers 143 performs all or part of the process 400 and is implemented in, for instance, a computer system as shown in FIG. 6.

In step 401, it is determined whether a particular entry is to be deleted. For example, a delete command is received through an API or a message is received from client 115 through client library 141 at routing tier server 143, or a message is received at local data structures service 150 from a routing tier server 143 to delete a particular entry associated with a particular key. Thus, step 401 includes determining to delete a particular entry from a distributed data store with eventually consistent replicated entries. Each entry includes a first field that holds data that indicates a key and a second field that holds data that indicates content associated with the key and a third field that holds data that indicates a version for the content.

In step 403, all replicates are marked as deleted with updated version. For example, a command is sent from routing tier servers 143 to consistent delete modules 151 to perform process 300 on local data structure services 150 for all storage nodes 145 that replicate the particular entry. Thus, the server 143 causes, at least in part, actions that result in marking the particular entry as deleted without removing the particular entry; and updating a version in the third field for the particular entry.

In step 405 it is determined whether to read the particular entry. For example, it is determined that a command is received through an API or a message is received from client 115 through client library 141 at routing tier server 143, or a message is received at local data structures service 150 from a routing tier server 143 to get the particular entry associated with the particular key that was earlier deleted.

In response to the get command, in step 407, one or more replicates of the particular entry are received, e.g., received at routing tier server 143 from get modules 154 on local data structure services 150 for one or more storage nodes 145 that replicate the particular entry. If responses are not received from a quorum of the nodes 145 that replicate the particular entry, then the get is unsuccessful and an unsuccessful get is reported to clients 115 during step 407.

If responses are received from at least the quorum of local data structure services 150 for the storage nodes 145 that replicate the particular entry, then in step 411 it is determined whether the values of all responses agree. Any method may be used to determine agreement, such as bit by bit comparison of the data in the content fields 220 of each response, or a bit by bit comparison of a hash of the contents, or by a comparison of the data in the version field 204, or some combination, in various embodiments. Thus step 411 includes, in response to a get command for the particular entry, determining whether all returned replicates of the particular entry include identical data in the second field (the value field).

If the values of all responses agree, then in step 413 it is determined whether all N replicates agree that the entry has been deleted. Thus step 413 includes determining, for a distributed data store with eventually consistent replicated entries, that all replicas of a particular entry are marked as deleted. If so, then in step 415, removal of the deleted entries is activated, e.g., by sending a message indicating removal to the background cleanup module 153 on local data structure services 150 for all storage nodes 145 that replicate the particular entry. The process to remove deleted entries at each node is described in more detail below with reference to FIG. 5. Thus, in response to determining that all replicas of a particular entry are marked as deleted, step 415 includes causing, at least in part, actions that result in removal of the particular entry from a data structure of the distributed data store. Step 415 is an example means to achieve the advantage of conserving storage space by permanently removing entries that have been consistently deleted on all storage nodes that replicate the entry.

Control then passes to step 417 to send the returned value to the client, including any notification that the entry has been deleted. For example, a message is sent from routing tier server 143 to clients 115 through a process of the client library 141, which indicates the agreed value or which indicates a deleted status. In the illustrated embodiment, the process 400 ends after step 417. If it is determined, in step 413, that fewer than N responses are received, then step 415 is skipped; and, control passes directly to step 417. Steps 413 is an example means to achieve the advantage of avoiding unintentionally reviving a deleted entry by retaining an entry marked as deleted until all replicates have been consistently marked.

According to some embodiments, a read repair in the resolving layer module 149 is used to provide a consistent delete response. In some of these embodiments, resolving layer module 149 is modified to reduce the chances of having to resolve the same discrepancy in the future. This provides the advantage of conserving network computational and bandwidth resources. These embodiments include one or more of steps 421 through 433, which are example means for achieving this advantage. In some embodiments one or more of the steps 421 through 433 are performed by resolving layer module 149 on or invoked by one or more routing tier servers 143.

If it is determined in step 411 that the quorum of responses received do not all agree with each other, then in step 421 the plurality of entries are sent to a read resolver. Any read resolver may be used. For example, in some embodiments, the read resolver selects the value most often provided among the multiple responses. In some embodiments, the read resolver selects the value associated with the latest version, e.g., highest version number. In some cases, several entries show the same latest version but still have different values, e.g., in the contents field 220. In some embodiments, a value (e.g., in contents field 220) is selected among several different values that have the same latest version by selecting the value that has the latest time indicated by the data in the time stamp field 206. In some embodiments, the read resolver does not determine a correct value in certain cases, e.g., when different values with the same latest version have no time stamp field. In some of these embodiments, the read resolver returns an exception, indicating a correct answer was not determined.

Thus, in some embodiments, step 421 includes determining the correct value for the second field by determining a correct value for the second field based on a value for the second field associated with a latest version in the third field of all returned replicates of the particular entry. In some embodiments, step 421 includes determining the correct value for the second field by determining a correct value for the second field based on a value for the second field associated with a most recent time stamp for the value in the second field among all returned replicates of the particular entry.

In step 423, it is determined whether the read resolver has returned an exception. If not, then a correct value has been determined by the read resolver. In step 425, the correct value is written to all available replicates of the particular entry, e.g., by issuing a put command with the correct value and particular key to put module 152 on the local data structure services 150 on the storage nodes 145 that replicate the particular entry. Step 425 is an example means for achieving the advantage of automatically updating the entries on at least some replicates to reduce the chance that the discrepancy will arise again on the next read (get) of the particular entry. Control also passes to step 417 to return the correct value to the client, as described above and end the process.

If it is determined, in step 423, that the read resolver has returned an exception, then a correct value is not known. In some embodiments, at least one or more different portions of the multiple different values (e.g., in content field 220) associated with the particular key are sent to the client 115 to be resolved, during step 427. In various embodiments, during step 427, the client 115 may apply an algorithm to determine the correct value; or the client may return the multiple different portions to the network service 110 to determine the correct value; or the network service may return the multiple different portions to the UE 101 for presentation to a user to determined the correct value. If no correct value is determined, step 427 does not return a correct value or returns a message indicating there is no correct value.

Thus, in some embodiments, step 427 includes causing, at least in part, actions that result in sending, to a client process, data indicating at least a plurality of different portions of values for the second field among all returned replicates of the particular entry. In some of the embodiments, step 427 also includes receiving, from the client process in response, data that indicates the correct value.

In step 431, it is determined whether a correct value is received. If not, the process ends; and the get fails. However, if it is determined in step 431 that a correct value is received, then, in step 433, the correct value is written to all available replicates of the particular entry. For example, a put command with the correct value and particular key is issued to put module 152 on the local data structure services 150 on the storage nodes 145 that replicate the particular entry. Step 433 is an example means for achieving the advantage of automatically updating the entries on at least some replicates to reduce the chance that the discrepancy will arise again on the next read (get) of the particular entry. The correct value is not returned to the client (e.g., client 115), because the client (e.g., client 115) provided the correct value; and the process ends.

Thus, either of step 421 or step 427 includes, if all returned replicates of the particular entry do not include identical data in the second field, then determining a correct value for the second field. Step 425 or step 433 includes issuing a put command with the correct value in the second field to all replicates of the particular entry. When implemented in the put module 152, the version is automatically updated if the put is successful (completed at a quorum of nodes that replicate the particular entry). Thus, in some embodiments, step 425 or step 433 includes causing, at least in part, actions that result in updating a version in the third field for the particular entry at a quorum of replicates of the particular entry.

Figure 5:
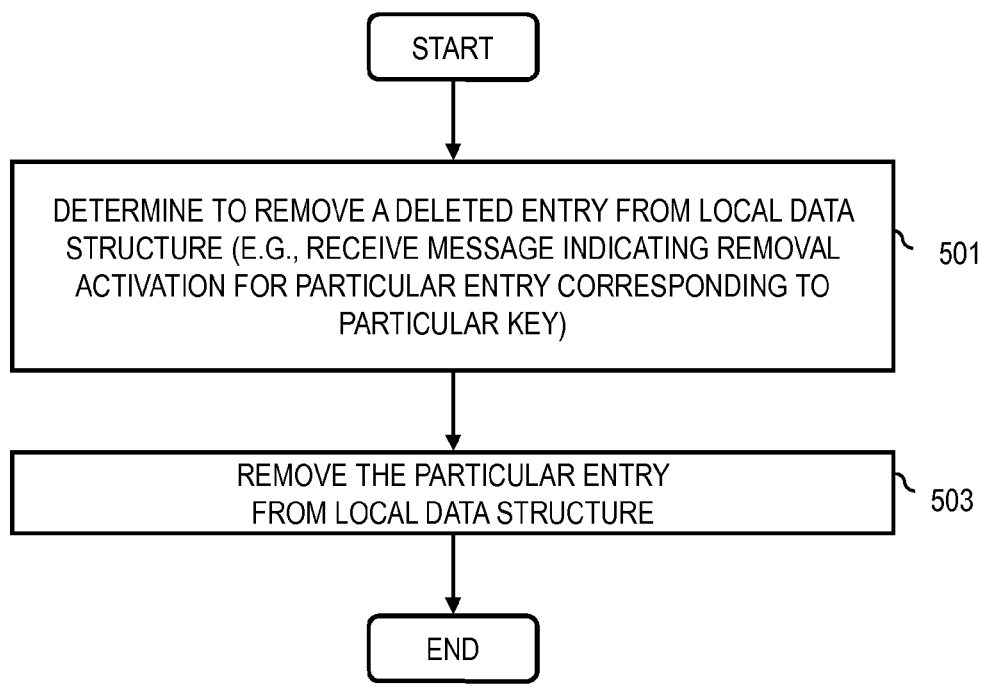
FIG. 5 is a flowchart of a process for removing deleted entries, according to one embodiment

FIG. 5 is a flowchart of a process 500 for removing deleted entries, according to one embodiment. In one embodiment, the background cleanup module 153 performs the process 500 and is implemented in, for instance, a chip set including a processor and a memory as shown in FIG. 7 or a computer system as shown in FIG. 6. In one embodiment, the consistent delete module 151 of a local data structure service 150 performs the process 500 and is implemented in, for instance, a chip set including a processor and a memory as shown in FIG. 7 or a computer system as shown in FIG. 6. In some embodiments, each of one or more routing tier servers 143 performs the process 500 and is implemented in, for instance, a computer system as shown in FIG. 6.

In step 501, it is determined to removal a deleted entry on a local data structure 145. For example, in some embodiments, it is determined that an activate removal message is received at the background cleanup module 153 from a routing tier server 143. This occurs, for example, as described above with reference to the process 400, when the routing tier server 143 determines that all replicas of a particular entry are marked as deleted. Thus, in some embodiments, step 501 includes determining, for a distributed data store with eventually consistent replicated entries, that all replicas of a particular entry are marked as deleted.

In step 503, the particular entry is removed from the local data structure on storage node 145. Thus, in some embodiments, step 503 includes, in response to determining that all replicas of a particular entry are marked as deleted, causing, at least in part, actions that result in removal of the particular entry from a data structure of the distributed data store.

The processes described herein for providing eventually consistent delete operations may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such example hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) for eventually consistent delete operations as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of eventually consistent delete operations.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to eventually consistent delete operations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for eventually consistent delete operations. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for eventually consistent delete operations, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for eventually consistent delete operations.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed for eventually consistent delete operations as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of eventually consistent delete operations.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein for eventually consistent delete operations. The memory 705 also stores the data associated with or generated by the execution of the inventive steps.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of eventually consistent delete operations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of eventually consistent delete operations. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 for eventually consistent delete operations. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request from at least one user to delete at least one entry from a distributed data store, wherein the distribute data store includes one or more replicates for the at least one entry;
   causing, at least in part, a marking of the at least one entry as deleted without removing the at least one entry, the one or more replicates, or a combination thereof from the distributed data store in response to the request;
   causing, at least in part, an initiation of at least one get command for the at least one entry;
   determining that there is at least one exception if one or more returned replicates of the at least one entry do not include an identical content value; and
   causing, at least in part, a presentation of at least one notification in at least one user interface based, at least in part, on the at least one exception,
   wherein the at least one entry includes, at least in part, a first field that holds a key, a second field that holds content associated with the key, and a third field that holds version information, and
   the marking of the at least one entry includes updating the version information held in the third field.

2. A method of claim 1, further comprising:
   causing, at least in part, a generation of at least one prompt to request a determination of at least one correct value for the one or more returned replicates from the at least one user,
   wherein the at least one notification includes, at least in part, the at least one prompt.

3. A method of claim 2, further comprising:
   determining one or more different values for the at least one entry from the one or more returned replicates; and
   causing, at least in part, a presentation of the one or more different values in the at least one notification for selection of the at least one correct value by the at least one user.

4. A method of claim 1, further comprising:
   causing, at least in part, an initiation of a determination of at least one correct value for the one or more returned replicates; and
   causing, at least in part, a generation of at least one error message if the at least one correct value cannot be determined,
   wherein the at least one notification includes, at least in part, the at least one error message.

5. A method of claim 4, wherein the determination of the at least one correct value is based, at least in part, on a quorum of the one or more returned replicates, version information associated with the one or more returned replicates, time stamp information associated with the one or more returned replicates, or a combination thereof.

6. A method of claim 1, further comprising:
   determining that one or more returned replicates comprise all of the one or more replicates for the at least one entry and that all of the one or more replicates include the identical content value; and
   causing, at least in part, a removal of the at least one entry, the one or more replicates, or a combination thereof from the distributed data store.

7. A method of claim 6, further comprising:
   causing, at least in part, a transmission of a removal message to one or more nodes of the distributed data store to initiate the removal of the at least one entry, the one or more replicates, or a combination thereof.

8. A method of claim 1, wherein the causing, at least in part, of the marking of the at least one entry as deleted, includes (a) setting data in a delete flag field of the at least one entry to indicate the at least one entry is to be deleted, or (b) setting data in a size field of the at least one entry to indicate zero size.

9. An apparatus comprising:
   at least one processor implemented at least partially by hardware; and at least one memory including computer program code for one or more programs, the at least one memory and the computer program code configured to, with the at least one processor, cause the apparatus to perform at least the following, receive a request from at least one user to delete at least one entry from a distributed data store, wherein the distribute data store includes one or more replicates for the at least one entry;

cause, at least in part, a marking of the at least one entry as deleted without removing the at least one entry, the one or more replicates, or a combination thereof from the distributed data store in response to the request;

cause, at least in part, an initiation of at least one get command for the at least one entry; praciticable determine that there is at least one exception if one or more returned replicates of the at least one entry do not include an identical content value; and cause, at least in part, a presentation of at least one notification in at least one user interface based, at least in part, on the at least one exception, wherein the at least one entry includes, at least in part, a first field that holds a key, a second field that holds content associated with the key, and a third field that holds version information, and the marking of the at least one entry includes updating the version information held in the third field.

10. An apparatus of claim 9, wherein the apparatus is further caused to:

cause, at least in part, a generation of at least one prompt to request a determination of at least one correct value for the one or more returned replicates from the at least one user, wherein the at least one notification includes, at least in part, the at least one prompt.

11. An apparatus of claim 10, wherein the apparatus is further caused to:

determine one or more different values for the at least one entry from the one or more returned replicates; and cause, at least in part, a presentation of the one or more different values in the at least one notification for selection of the at least one correct value by the at least one user.

12. An apparatus of claim 9, wherein the apparatus is further caused to:

cause, at least in part, an initiation of a determination of at least one correct value for the one or more returned replicates; and cause, at least in part, a generation of at least one error message if the at least one correct value cannot be determined, wherein the at least one notification includes, at least in part, the at least one error message.

13. An apparatus of claim 12, wherein the determination of the at least one correct value is based, at least in part, on a quorum of the one or more returned replicates, version information associated with the one or more returned replicates, time stamp information associated with the one or more returned replicates, or a combination thereof.

14. An apparatus of claim 9, wherein the apparatus is further caused to:

determine that one or more returned replicates comprise all of the one or more replicates for the at least one entry and that all of the one or more replicates include the identical content value; and cause, at least in part, a removal of the at least one entry, the one or more replicates, or a combination thereof from the distributed data store.

15. An apparatus of claim 14, wherein the apparatus is further caused to:

cause, at least in part, a transmission of a removal message to one or more nodes of the distributed data store to initiate the removal of the at least one entry, the one or more replicates, or a combination thereof.

16. A non-transitory computer-readable storage medium carrying one or more sequences of one or more instructions which, when executed by one or more processors, cause an apparatus to at least perform the following steps:

receiving a request from at least one user to delete at least one entry from a distributed data store, wherein the distribute data store includes one or more replicates for the at least one entry;

causing, at least in part, a marking of the at least one entry as deleted without removing the at least one entry, the one or more replicates, or a combination thereof from the distributed data store in response to the request;

causing, at least in part, an initiation of at least one get command for the at least one entry;

determining that there is at least one exception if one or more returned replicates of the at least one entry do not include an identical content value; and causing, at least in part, a presentation of at least one notification in at least one user interface based, at least in part, on the at least one exception, wherein the at least one entry includes, at least in part, a first field that holds a key, a second field that holds content associated with the key, and a third field that holds version information, and the marking of the at least one entry includes updating the version information held in the third field.

17. A non-transitory computer-readable storage medium of claim 16, wherein the apparatus is further caused to perform:

causing, at least in part, a generation of at least one prompt to request a determination of at least one correct value for the one or more returned replicates from the at least one user, wherein the at least one notification includes, at least in part, the at least one prompt.

18. A non-transitory computer-readable storage medium of claim 17, wherein the apparatus is further caused to perform:

determining one or more different values for the at least one entry from the one or more returned replicates; and causing, at least in part, a presentation of the one or more different values in the at least one notification for selection of the at least one correct value by the at least one user.

19. A non-transitory computer-readable storage medium of claim 16, wherein the apparatus is further caused to perform:

causing, at least in part, an initiation of a determination of at least one correct value for the one or more returned replicates; and causing, at least in part, a generation of at least one error message if the at least one correct value cannot be determined, wherein the at least one notification includes, at least in part, the at least one error message.

* * * * *